Oct. 31, 1967  L. E. HUSTED  3,350,124
METHOD OF CONNECTING PARTS AND PARTS CONNECTED BY THE METHOD
Filed May 5, 1965  3 Sheets-Sheet 1

INVENTOR.
LAWRENCE E. HUSTED
BY Busser Smith & Hardy

ATTORNEYS

Oct. 31, 1967 L. E. HUSTED 3,350,124
METHOD OF CONNECTING PARTS AND PARTS CONNECTED BY THE METHOD
Filed May 5, 1965 3 Sheets-Sheet 2

INVENTOR.
LAWRENCE E. HUSTED
BY
ATTORNEYS

Oct. 31, 1967  L. E. HUSTED  3,350,124
METHOD OF CONNECTING PARTS AND PARTS CONNECTED BY THE METHOD
Filed May 5, 1965  3 Sheets-Sheet 3

*INVENTOR.*
LAWRENCE E. HUSTED
BY
ATTORNEYS

United States Patent Office 3,350,124
Patented Oct. 31, 1967

3,350,124
METHOD OF CONNECTING PARTS AND
PARTS CONNECTED BY THE METHOD
Lawrence E. Husted, Fairhill, Pa., assignor to Ametek,
Inc., New York, N.Y., a corporation of Delaware
Filed May 5, 1965, Ser. No. 453,421
8 Claims. (Cl. 287—189.36)

ABSTRACT OF THE DISCLOSURE

A sheet of metal is connected to a second part by forming an opening in the second part having an entrance neck portion leading to an enlarged portion having an at least partially arcuate wall. An end of the sheet is introduced into the opening and the sheet moved to curl it within the opening. In one embodiment, the curling is continued until the end contacts the sheet thus forming a closed loop. A groove may be provided to receive the second part together with a bead which is received in the groove when a closed loop is formed.

---

This is a continuation-in-part of my application Ser. No. 399,774, filed Sept. 28, 1964, now Patent No. 3,299,545.

This invention relates to a method for connecting parts and more particularly relates to connecting a sheet of material such as metal to a second part. The invention also relates to parts connected by the method of the invention.

It is frequently desired to secure a metal sheet to a second part which also generally is of metal. A multitude of techniques are available to make such connections, such as for example, welding, soldering, bolting to name but a few. Generally speaking, making such a connection is time consuming and expensive to the extent that it requires additional material. In accordance with this invention, such expense and consumption of time is eliminated in that the connection can be made with a simple press operation and no additional materials of any nature are required.

In addition, the connection of this invention is a secure one. Further, where desirable, a high degree of heat transfer between the parts connected is achieved.

Additionally, the invention is of great value for heat exchange apparatus since the making of the connection of the invention can also result in the formation of one or more fluid conducting tubes.

In accordance with the method of the invention, an opening having an entrance neck portion leading to an enlarged portion is formed in the part to which it is desired to connect a sheet. The neck is formed with a minimum width which is less than the maximum width of the enlarged portion of the opening. The wall of the enlarged opening is formed so as to be arcuate or generally arcuate for at least a portion of its extent, desirably for more than 180°.

An end of the sheet which it is desired to connect to the thus formed part is positioned through the neck of the opening and in contact with the arcuate portion of the wall of the opening at an acute angle thereto. Then the sheet is moved with a press or the like into the opening to cause the end of the sheet to follow the arc of the wall and curl to set a curl, desirably over 180°, which fits tightly within the opening inside of the neck. Desirably, the sheet is moved through the neck of the opening adjacent the wall of the neck away from which the end of the sheet will move during the initial curling and against which the sheet will rest when secured.

The method of the invention and the products of the method will be further clarified from a reading of the following description in conjunction with the drawings in which.

Figure 1:
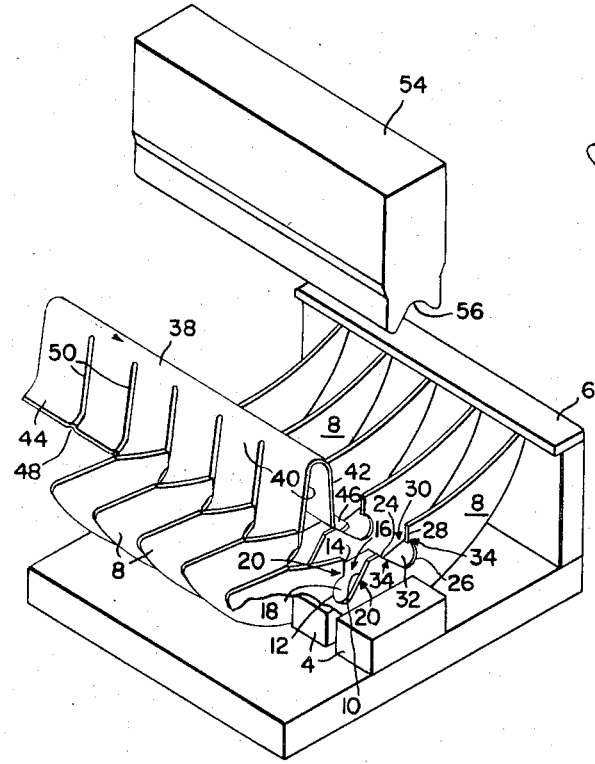
FIGURE 1 is a front perspective view illustrating the first step in connecting a sheet metal spacer bar to a plurality of tines.

Referring now to FIGURE 1, a jig 2 having spaced block members 4 and a holding bar 6 supports tines 8 in spaced relation. Each tine 8 has a straight wall portion 10, and arcuate wall portion 12 and a straight wall portion 14 defining an opening 16 having an enlarged portion 18 and a reduced neck portion indicated by the arrows 20—20 which has a width less than the maximum width of the enlarged portion 18. Each tine 8 also has a straight wall portion 24, an arcuate wall portion 26 and a straight wall portion 28 forming an opening indicated at 30 which has an enlarged inner portion 32 and a reduced neck portion indicated by the arrows 34—34.

A spacer bar 38 of sheet steel is pre-formed with a pair of downwardly extending sides 40 and 42 and with outwardly curled ends 44 and 46. Spacer bar 38 is formed with inner grooves 48 which are spaced apart the distance between tines 8 and which in their formation form outwardly extending beads 50.

Figure 4:
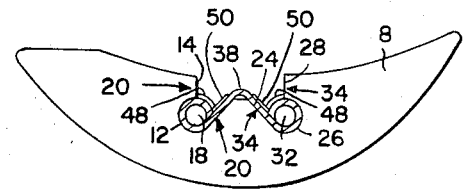
FIGURE 4 is a side elevation partially broken away showing the completed connection between the spacer bar and a tine.
Figure 2:
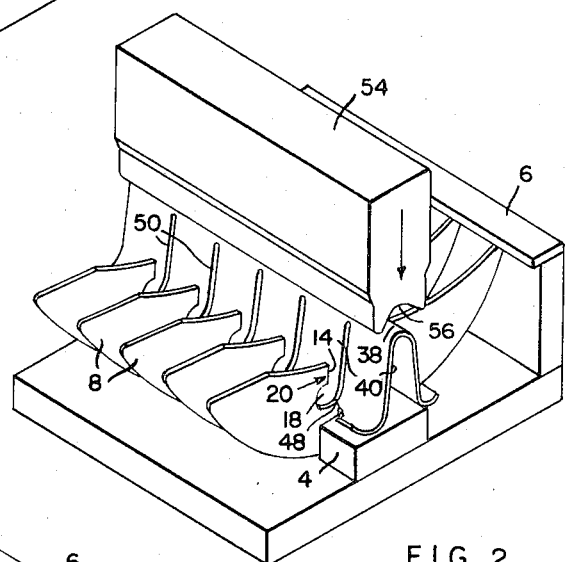
FIGURE 2 is a front perspective view of the parts shown in FIGURE 1 advanced to a further stage.
Figure 3:
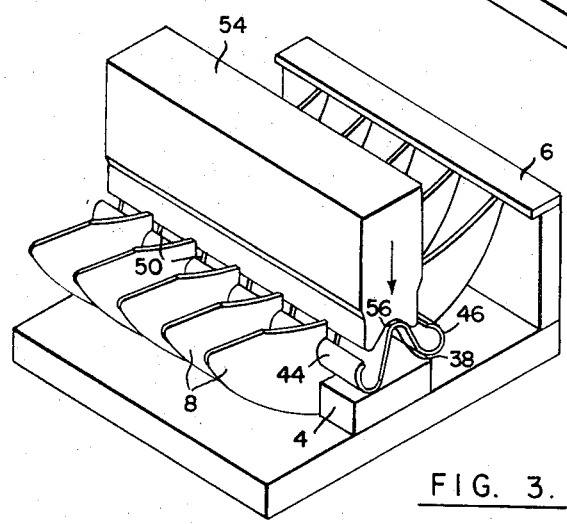
FIGURE 3 is a front perspective view of the parts shown in FIGURE 2 advanced to a further stage wherein the spacer bar is being curled into engagement with the tines.
Figure 5:
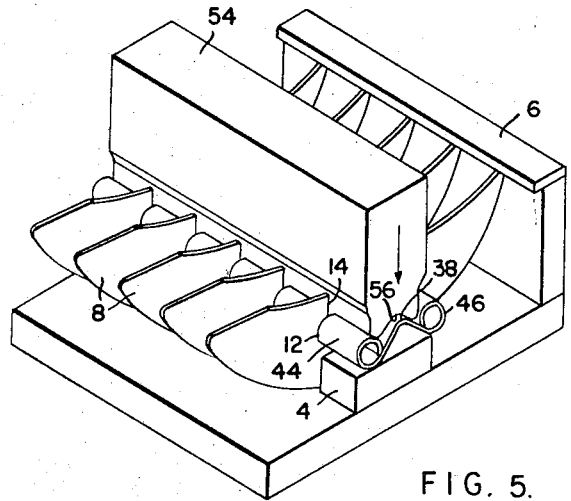
FIGURE 5 is a front perspective view of the parts of FIGURE 3 at the completion of the formation of the connection between the spacer bar and the tines.

As illustrated in FIGURE 1, spacer bar 38 is moved laterally to pass curled edges 44 and 46 through openings 16 and 30, respectively in each tine 8 until spacer bar 38 is positioned as illustrated in FIGURE 2 with each groove 48 engaged by a tine 8. A punch 54 having a V-shaped end 56 which is actuated by a press (not shown) is moved downwardly as shown in FIGURE 3 to engage spacer bar 38 and move the upper part thereof downwardly which causes curled ends 44 and 46 to follow the contour of arcuate walls 12 and 26, respectively, to curl these ends into an arc of over 180° below the necks indicated by the arrows 20—20 and 34—34, respectively. As shown in FIGURE 5, the action is continued until the arc of the curl of each end extends to be engaged by punch 54 and in engagement with walls 40 and 42, respectively with each groove 48 engaged by its mating bead 50 as best seen in FIGURE 4 where the completed connection between spacer bar 38 and a tine 8 is shown.

In the above illustrated method of the invention, the ends to be curled in the receiving openings were pre-rolled since it was necessary to carry out other forming operations on the spacer bar. Where such pre-forming operations are not necessary, the same connection can be made readily without pre-rolling the edges which are to be curled in the receiving opening.

Figure 6:
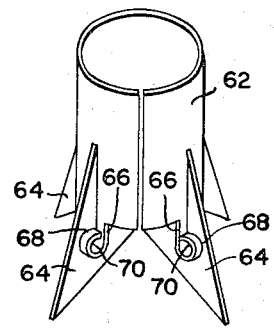
FIGURE 6 is a front perspective view of a tube-fin embodiment of the invention.

It will be apparent that the method of forming a connection between two parts in accordance with the invention is widely applicable. FIGURE 6 illustrates the connection of a tubular member 62 to fins 64; tubular member 62 has dependent strip portions 66 forced into openings 68 so as to have a curled portion 70 locked in each opening 68.

Figure 7:
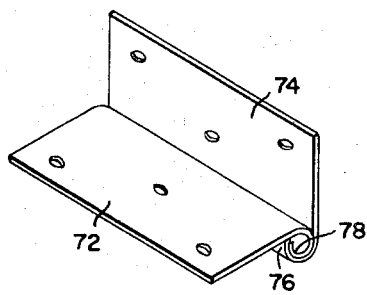
FIGURE 7 is a front perspective view of a hinge embodiment of the invention.

FIGURE 7 illustrates a pair of hinged leaves 72 and 74. Leaf 74 has one side formed into an arcuate portion 76. The adjacent side of leaf 72 has been forced into the interior of the arcuate portion 76 to form a curled portion 78 thus providing a pivoted connection between leaves 72 and 74.

Figure 8:
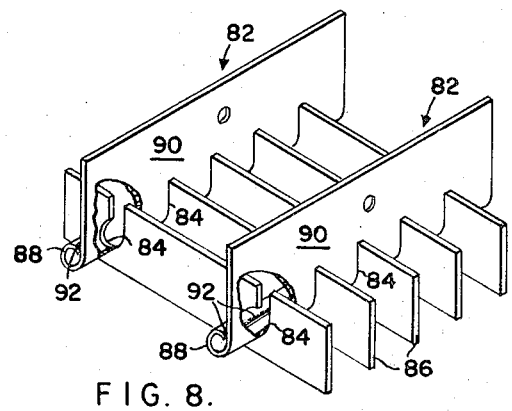
FIGURE 8 is a side perspective view of a heat exchange embodiment of the invention.

A further typical use is illustrated in FIGURE 8, where sheet metal hangers 82 have been forced downwardly into openings 84 of heat exchanger fins 86 to form curled portions 88 securely locked within opening 84. Each curled portion 88 is curled around so as to abut against the body 90 of hanger 82 to which it is braised as indicated at 92 so that the curled portions 88 can function as pipes to carry hot or cold fluids as may be desired.

Figure 10:
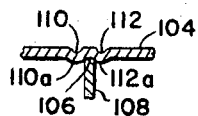
FIGURE 10 is a sectional view illustrating an alternative beading arrangement of the invention.
Figure 9:
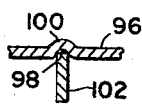
FIGURE 9 is a sectional view illustrating a beading arrangement in accordance with the invention.

As was illustrated in FIGURE 4, it is frequently desirable to bead and groove the sheet where it will engage the opening of the part to which it is to be secured and preferably for a sufficient extent so that after curling for an arc of 360° or more, the bead and groove will interlock. Thus, as illustrated in FIGURE 9, a typical sheet 96 may be provided with a groove 98 and a corresponding bead 100, the groove 98 shown engaged by an edge of a part 102 to which sheet 96 is to be connected. This is the type of arrangement employed in the embodiment of FIGURE 4. Alternatively, as shown in FIGURE 10, a sheet 104 can be provided with a groove 106 for the engagement of part 108 to which it is to be connected by punching out a pair of grooves 110 and 112 to form beads 110a and 112a respectively.

Figure 11:
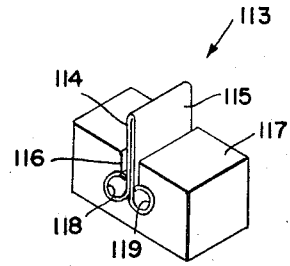
FIGURE 11 is a side perspective view of an alternative embodiment of the invention.

FIGURE 11 illustrates the connection of a sheet 113 having legs 114 and 115 in an opening 116 of a block 117 by forcing legs 114 and 115 into opening 116 to form curled ends 118 and 119.

Figure 12:
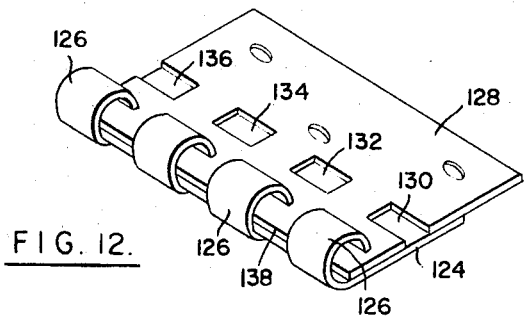
FIGURE 12 is a top perspective view of a hinge embodiment of the invention in a state of partial formation.
Figure 13:
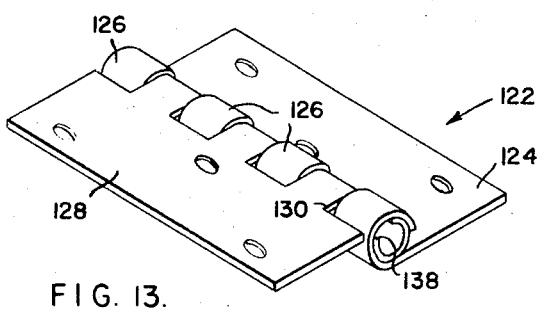
FIGURE 13 is a top perspective view of the hinge of FIGURE 12 fully formed.

FIGURES 12 and 13 further illustrate the employment of the method of the invention to form a hinge 122 which is shown in FIGURE 13. As shown in FIGURE 12, a leaf 124 is provided with spaced arcuate hinge portions 126. A second leaf 128 provided with openings 130, 132, 134 and 136 has its side 138 forced into arcuate hinge portions 126, desirably mounted in a supporting die (not shown), forcing edge 138 to curl to the shape illustrated in FIGURE 13 in which position openings 130, 132, 134 and 136 are adapted to receive the opposed arcuate hinge portions 126 to form a pivotal connection between leaf 124 and leaf 128.

Figure 14:
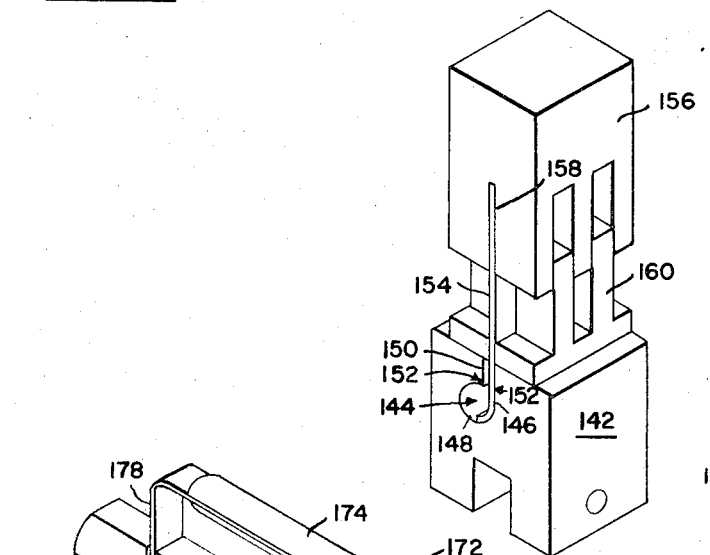
FIGURE 14 is a side perspective view showing the commencement of the connection of a sheet to a block.
Figure 15:
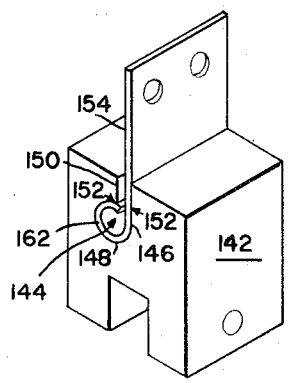
FIGURE 15 is a side perspective view showing the sheet and block of FIGURE 14 with the connection completed.

FIGURES 14 and 15 illustrate the connection of a sheet to a block part. Block 142 is provided with an opening 144 which has a straight wall portion 146, an arcuate wall portion 148 and a straight wall portion 150, walls 146 and 148 forming an enlarged opening portion which is below a restricted neck portion indicated between arrows 152—152. A metal sheet 154 is urged downwardly by a punch 156 having a groove 158 for the reception of sheet 154. A guide 160 is provided to prevent sheet 154 from buckling. As sheet 154 is urged downwardly into opening 144, it engages arcuate wall 148 at an acute angle and follows this wall to form an arcuate portion 162 (FIGURE 15) which is locked in opening 144 below the neck indicated by arrows 152–152.

Figure 16:
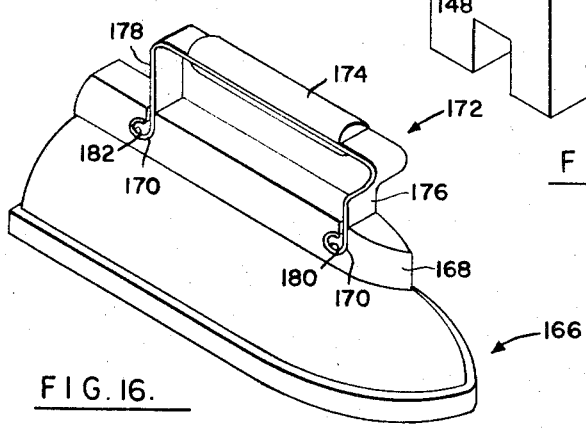
FIGURE 16 is a side perspective view illustrating the use of the invention to connect a handle to an iron.

As shown in FIGURE 16, an iron 166 is provided with a head portion 168 having openings 170 which are identical with openings 144. A handle 172 having an insulated portion 174 has depending sheet portions 176 and 178 which have been forced downwardly into openings 170, 170 to form curled end portions 180 and 182 locked in openings 170, 170.

What is claimed is:
1. The method of connecting a metal sheet to a second part comprising:
   means forming an opening in the second part having an entrance neck portion leading to an enlarged portion,
   the said neck portion having a width less than the maximum width of the enlarged portion,
   and the wall of the enlarged portion being at least partially arcuate,
   introducing an end of the sheet into the opening to place the end of the sheet in contact with the arcuate portion of the wall at an acute angle and moving the sheet towards the said opening to curl the said end within the enlarged portion of the opening until said end contracts the sheet to form a closed loop.
2. The method of connecting a metal sheet to a second part comprising:
   means forming an opening in the second part having an entrance neck portion leading to an enlarged portion,
   the said neck portion having a width less than the maximum width of the enlarged portion,
   and the wall of the enlarged portion being at least partially arcuate,
   introducing an end of the sheet into the opening to place the end of the sheet in contact with the arcuate portion of the wall at an acute angle and moving the sheet towards the said opening to follow the arcuate wall of the opening and curl the said end within the enlarged portion of the opening until said end contracts the sheet to form a closed loop.
3. The method of connecting a metal sheet to a second sheet comprising:
   forming an opening in the second sheet having an entrance neck portion leading to an enlarged portion,
   the said neck portion having a width less than the maximum width of the enlarged portion and the wall of the enlarged portion being at least partially arcuate, forming a bead and a mating groove in the metal sheet leading from one end thereof and in a plane for the reception of the second sheet,
   positioning said one end of the sheet in the opening with the groove engaged by the second sheet and the said one end of the sheet being in contact with the arcuate portion of the wall at an acute angle and moving the sheet towards said opening to curl the said one end until the groove therein is engaged by it mating bead.
4. The method of forming a metal sheet to a second sheet comprising:
   forming a pair of adjacent openings in the second part each having an entrance neck portion leading to an enlarged portion,
   each said neck portion having a width less than the maximum width of the enlarged portion and the wall of each enlarged portion being at least partially arcuate, forming a bead and a mating groove in the metal sheet leading from each of two opposite ends thereof and in a plane for the reception of the second sheet,
   positioning a pair of opposite ends of the sheet into the openings respectively to place each end of the sheet in contact with the arcuate portion of the wall of the opening in which it is introduced at an acute angle and moving the sheet towards the said open- ings to curl the said ends until each groove is engaged by its mating bead.

5. A metal sheet and a second part,
wall means defining an opening in said second part having a neck portion leading to an enlarged portion having a wall which is at least partially arcuate,
the neck portion being narrower than the maximum width of the said enlarged portion, and
the end of the sheet being curled within said enlarged portion of the opening and in contact with the wall of the enlarged portion, said curled end forming a closed loop with said end being in contact with the sheet.

6. A metal sheet having a bead and a mating groove extending from one end thereof and a second sheet,
means forming an opening in said second sheet having a neck portion leading to an enlarged portion having a wall which is at least partially arcuate,
the neck portion being narrower than the maximum width of the said enlarged portion,
the said one end of the sheet being curled within said enlarged portion of the opening and having its groove engaged by the wall of the enlarged portion,
the curled end of the sheet extending to engage the bead with the mating groove.

7. A metal sheet and a second part,
wall means defining an opening in said second part having a neck portion leading to an enlarged portion having a wall which is at least partially arcuate,
the neck portion beig narrower than the maximum width of the said enlarged portion,
one end of the sheet being curled within said enlarged portion of the opening and being in contact with the wall of the enlarged portion,
said one end of the sheet extending to be in contact with another portion of the sheet and,
continuous means securing said one end of the sheet to said another portion of the sheet and extending along the complete line of said contact to form a fluid conducting tube.

8. A metal sheet having a bead and a mating groove extending from each of two opposite ends thereof and a second sheet,
means forming a pair of openings in said second sheet each having a neck portion leading to an enlarged portion having a wall which is at least partially arcuate, the neck portion being narrower than the maximum width of the enlarged portion,
said ends of the sheet being curled respectively within the enlarged portions of the openings and having its grooves respectively received by the walls of the enlarged portions,
the curled ends of the sheet extending to engage the beads with the mating grooves respectively.

References Cited
UNITED STATES PATENTS

| | | | |
|---|---|---|---|
| 2,423,896 | 7/1947 | Lave | 29—521 |
| 2,453,504 | 11/1948 | Fleischer | 29—522 |

EDWARD C. ALLEN, *Primary Examiner.*